(12) United States Patent
Hamelin

(10) Patent No.: US 6,752,461 B2
(45) Date of Patent: Jun. 22, 2004

(54) VEHICLE SEAT HAVING A BACK THAT CAN BE FOLDED DOWN FORWARDS

(75) Inventor: Bruno Hamelin, Combes-la-Ville (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 09/990,416

(22) Filed: Nov. 21, 2001

(65) Prior Publication Data

US 2002/0135216 A1 Sep. 26, 2002

(30) Foreign Application Priority Data

Nov. 24, 2000 (FR) .......................................... 00 15187

(51) Int. Cl.⁷ ................................................. B60N 2/02
(52) U.S. Cl. ........................... 297/378.12; 297/378.14
(58) Field of Search ........................ 297/378.12, 378.14

(56) References Cited

U.S. PATENT DOCUMENTS

| | | | |
|---|---|---|---|
| 3,328,077 A | * | 6/1967 | Krasinski ............... 297/378.14 |
| 4,700,989 A | | 10/1987 | Ercilla ....................... 297/331 |
| 5,052,748 A | | 10/1991 | Fourrey et al. .............. 297/124 |
| 5,393,116 A | | 2/1995 | Bolsworth et al. .......... 296/65.1 |
| 5,718,481 A | * | 2/1998 | Robinson ..................... 297/367 |
| 6,161,899 A | | 12/2000 | Yu ........................ 297/378.12 |

FOREIGN PATENT DOCUMENTS

| | | | | |
|---|---|---|---|---|
| EP | 0 980 785 | | 2/2000 | |
| EP | 0 990 092 | | 5/2000 | |
| JP | 59034940 A | * | 2/1984 | ............ B60N/1/10 |

\* cited by examiner

Primary Examiner—Peter M. Cuomo
Assistant Examiner—Stephen D'Adamo
(74) Attorney, Agent, or Firm—McCracken & Frank LLP

(57) ABSTRACT

A vehicle seat comprising a seat proper, a back presenting at least a folding portion, a rigid plate between the seat proper and the folding portion, a control mechanism for locking the folding portion, and a control member. The control mechanism has a control piece that is pivotally mounted about an axis, said control piece being urged about the axis towards a rest position, the piece having a guide slot in which there slides a peg that is secured to the rigid plate, a first lateral branch extends to a closed end for receiving the peg when the folding portion is raised, and a second lateral branch extending to a closed end receives the peg when the folding portion is folded down.

7 Claims, 3 Drawing Sheets

VEHICLE SEAT HAVING A BACK THAT CAN BE FOLDED DOWN FORWARDS

FIELD OF THE INVENTION

The present invention relates to vehicle seats, in particular car seats, including a back that can be folded down onto the seat proper.

More particularly, the invention relates to a vehicle seat comprising:

- a seat proper;
- a back presenting at least a folding portion capable of pivoting to a limited extent about a first transverse horizontal axis between a raised position for use and a position in which it is folded down forwards;
- a rigid plate connecting the folding portion of the back to the seat proper; and
- a control mechanism adapted to lock the folding portion of the back either in the raised position or in the folded-down position, said control mechanism including a control piece actuatable by a user to unlock said folding portion of the back.

BACKGROUND OF THE INVENTION

By way of example, such a seat is described in document EP-A-0 999 092.

In that known seat, the back has two walls and two associated hooks, each wall and its hook serving to lock the back either in the in-use position, or else in the folded-down position. The presence of the two hooks complicates the locking system and the kinematics of the back implies that the back projects rearwards when in the folded-down position.

U.S. Pat. No. 5,393,116 also describes a vehicle seat having a back that can be folded down forwards and a locking mechanism interposed between the seat proper and the back of said seat. The locking mechanism comprises a control piece having an S-shaped guide slot, said control piece being pivotally mounted on the rigid plate which connects the back to the seat proper. That complex locking mechanism also comprises a cam plate interposed between the control piece and the rigid plate, said cam plate also being provided with an S-shaped guide slot which substantially overlies the S-shaped guide slot of the control piece.

A guide peg secured to the back is also received in the respective guide slots of the control piece and of the cam plate.

The locking mechanism described in U.S. Pat. No. 5,393,116 is adapted so that the guide slot of the control piece locks the peg when the back is in its raised position, while the guide slot of the cam plate locks the same peg when the back is in its folded-down position.

That complex locking mechanism thus requires the control piece to be positioned very accurately relative to the cam plate in order to enable the back to be locked in its raised or lowered position, thereby complicating assembly of said locking mechanism on the vehicle seat.

In addition, the presence of two guide slots can cause the peg which is secured to the back to become jammed when the back is in an intermediate position between its raised and lowered positions.

OBJECTS AND SUMMARY OF THE INVENTION

A particular object of the present invention is to mitigate the above-mentioned drawbacks of the prior art.

To this end, according to the invention, the control piece is pivotally mounted on the folding portion of the back about a second transverse horizontal axis parallel to the first axis, said control piece being urged resiliently in a first angular direction about the second axis towards a rest position and being movable by a user in a second angular direction opposite to the first away from its rest position into an actuated position, said control piece having an S-shaped guide slot within which a guide peg secured to the rigid plate is received, said slot comprising:

- a curved middle portion adapted to receive the peg when the control piece is in the actuated position, said middle portion being disposed between the first and second axes and extending between first and second ends in the vicinity of which the peg is to be found respectively in the raised position and in the folded-down position of the folding portion of the back, said middle portion of the slot being disposed to extend in a substantially circumferential direction about the first axis when the control piece is in the actuated position;
- a first lateral branch which communicates with the first end of the middle portion of the slot and which extends in the second angular direction substantially circumferentially about the second axis to a closed end which is adapted to receive the peg when the folding portion of the back is in the raised position and the control piece is in the rest position, the first branch of the slot being adapted then to lock the folding portion of the back in its raised position; and
- a second lateral branch communicating with the second end of the middle portion of the slot and extending in said angular direction substantially circumferentially about the second axis, to a closed end which is adapted to receive the peg when the folding portion of the back is in the folded-down position and the control piece is in the rest position, the second branch of the slot being adapted then to lock the folding portion of the back in the folded-down position.

Because of the disposition of the control means and the shape of its guide slot in combination with the way the slot moves relative to the peg, the user can fold the back down onto the seat and lock it, or can raise the back, and lock it, by acting on a single control member in a single drive direction.

In preferred embodiments of the invention, use may optionally be made of one or more of the following dispositions:

- the middle portion of the slot is circularly arcuate in shape, being centered on the first axis when the control piece is in its actuated position;
- the end of the second lateral branch of the slot co-operates with the middle portion of the slot to define a catch which comes into contact with the peg when the folding portion of the back is in its folded-down position and the control piece is in its rest position, said catch being shaped to bear against the peg and prevent said peg from sliding into the middle portion of the slot when the folding portion of the back is urged towards its raised position;
- the lateral branches of the slot are disposed so as to extend substantially radially relative to the first axis of rotation in opposite directions from said middle portion of the slot when the control piece is in the actuated position;
- the control piece comprises a guide member for co-operating with a guide surface formed on the rigid plate to enable the peg to be substantially centered within the guide slot of the control piece when said control piece is in its actuated position;

the guide surface of the rigid plate is defined between two notches in which the guide member of the control piece is received when the folding portion of the back is in its raised position or its folded-down position so as to enable the control piece to be urged resiliently into its rest position; and the distance measured between the first axis of rotation and the base of either one of the lateral branches of the guide slot corresponds to substantially the distance as measured between said first axis of rotation and the end of the other lateral branch of said slot.

BRIEF DESCRIPTION OF THE DRAWINGS

Other characteristics and advantages of the invention appear from the following description of an embodiment, given by way of non-limiting example and with reference to the accompanying drawings.

In the drawings.

MORE DETAILED DESCRIPTION

In the various figures, the same references are used to designate elements that are identical or similar.

Figure 1:
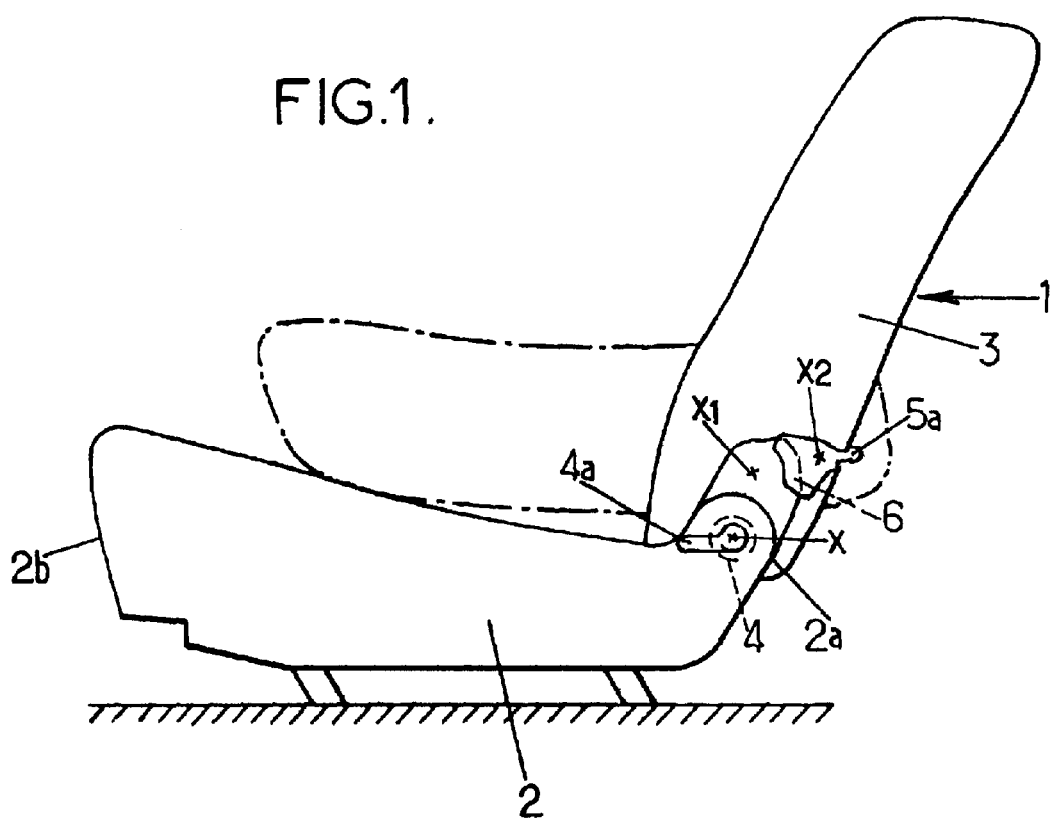
FIG. 1 is a side elevation view of a seat in accordance with the invention.

FIG. 1 shows a motor vehicle seat 1 which comprises:

firstly a seat proper 2 extending between a rear end 2a and a front end 2b (the terms "front" and "rear" are relative to the seat, and do not specify any particular orientation for the seat 1 inside the vehicle); and secondly a back 3 pivotally mounted to the rear end 2a of the seat proper 2 about a transverse horizontal pivot axis X1.

In the particular example shown, the back 3 presents at least one folding portion 3a (possibly constituting the entire back 3), which pivots about the axis X1. The folding portion of the back is connected to the seat proper via a rigid plate 6 forming part of the framework of the seat proper or adjustably mounted on said framework, the folding portion of the back forming a first seat element while the rigid plate forms a second seat element.

In the example shown in FIG. 1, the rigid plate 6 is also pivotally mounted on the seat proper 2 about a transverse horizontal axis X so as to enable the inclination of the back 3 and of its folding portion 3a to be adjusted by means of a hinge 4 actuated by a first handle 4a.

A control mechanism enables the folding portion 3a to be moved between:

firstly a raised position in which said folding portion of the back is placed substantially vertically and allows a passenger to be seated; and secondly a lowered position which in the example shown is a "stool" position in which the folding portion of the back extends substantially horizontally, parallel to the seat 2.

The control mechanism comprises a control piece 5 actuated by a second handle 5a, said control piece 5 being hinged about a second transverse horizontal axis X2 passing through the folding portion 3a of the back parallel to the axes X and X1.

A user can actuate the second handle 5a to release the control piece 5, enabling the folding portion of the seat to be moved between its raised or in-use position and its position in which it is folded down forwards.

The various functions mentioned above can be implemented by means of two control pieces 5 located on either side of the seat 1, with only one of them being visible in the drawings. It is also possible for the seat 1 to be provided with a single control piece that is located on one side only of the seat.

If the seat is provided with two control pieces, then a connection bar mechanically interconnects the control pieces and only one of them need be fitted with an actuating handle 5a.

Figure 2:
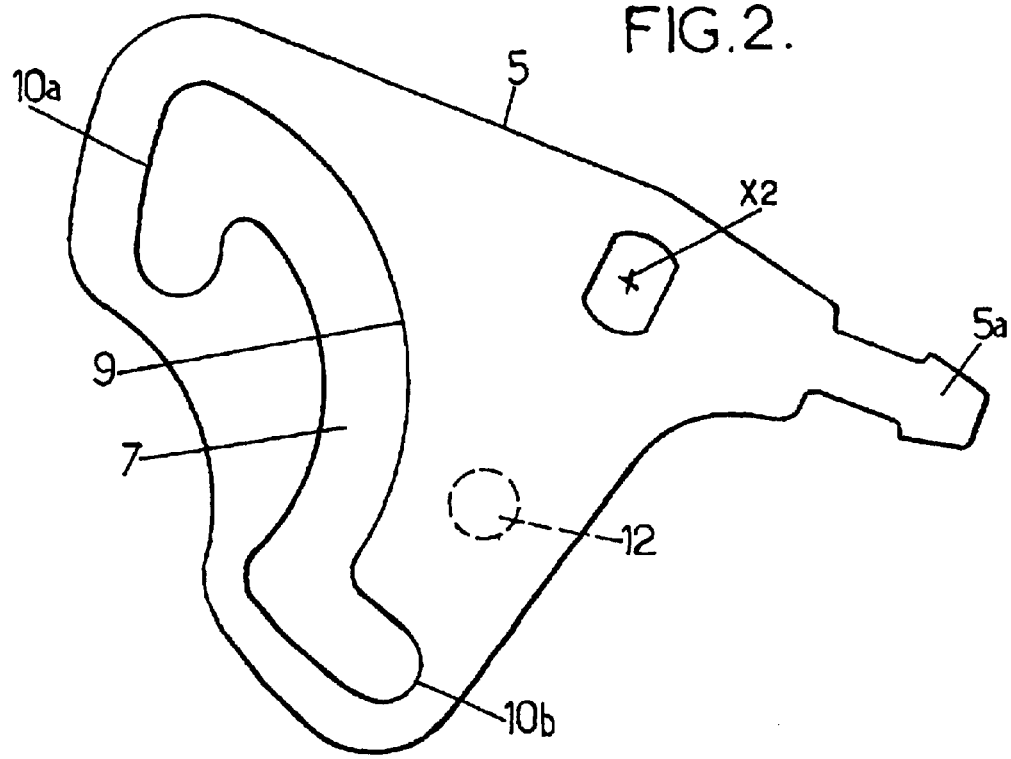
FIG. 2 is a plane elevation view of the control piece used in the hinge of the FIG. 1 seat.

FIG. 2 shows the control piece 5 of the seat 1. This piece is substantially triangular in shape, being hinged to the folding portion 3a about the horizontal axis X2 and it makes it possible firstly for the folding portion 3a of the back to pivot relative to the seat proper about the axis X1, thus enabling it to be put into the stool position and also enabling it to be returned (to the raised position), and secondly to lock the folding portion of the back in each of its raised and lowered positions.

The control piece 5 is resiliently biased in a first angular direction about the second axis X2 towards a rest position and the user can move it in a second angular direction opposite to the first, away from its rest position and towards an actuated position.

For this purpose, the control piece 5 includes an S-shaped guide slot 7 which receives a guide peg 8 which is fixed and secured to the rigid plate 6.

The guide slot 7 comprises firstly a middle portion 9 along which said folding portion 3a of the back can occupy a range of intermediate positions between its raised position and its lowered position, and secondly two lateral branches 10a, 10b at opposite ends of the middle portion 9 and in communication therewith, these lateral branches 10a and 10b extending substantially perpendicularly relative to the adjacent ends of the middle portion 9.

The middle portion 9 of the guide slot 7 is in the form of an arc of a circle, and it is adapted to receive the peg 8 when the control piece 5 is in its actuated position. This middle portion 9 is placed between the first and second axes X1 and X2 and it extends between first and second ends in the vicinity of which the peg 8 is located, respectively when the folding portion 3a of the back is in the raised position and in the lowered position. In addition, said middle portion 9 of the slot 7 is disposed so as to extend along a direction that is substantially circumferential relative to the first axis X1 when the control piece 5 is in the actuated position.

The middle portion 9 is centered on the first axis X1 when the control piece 5 is in the actuated position.

Each of the lateral branches 10a, 10b defines a position in which the folding portion 3a of the back 3 can be locked relative to the seat proper 2.

The first lateral branch 10a communicates with the first end of the middle portion 9 of the slot 7 and extends in a direction that is substantially circumferential relative to the second axis X2.

Furthermore, in the second angular direction about the second axis X2, the first branch 10a extends to a closed end that is adapted to receive the peg 8 when the folding portion 3a of the back 3 is in its raised position and the control piece 5 is in its rest position. In this raised position of the folding portion 3a of the back, the first branch 10a of the slot 7 is adapted to lock the folding portion 3a of the back 3.

For this purpose, the end of the first lateral branch 10a of the slot 7 co-operates with the middle portion 9 of the slot 7 to define a catch 18 which comes into contact with the peg 8 when the folding portion 3a of the back 3 is in the raised position and the control piece 5 is in the rest position (FIG. 3), the catch 18 being shaped so as to bear against the peg 8 and prevent the peg 8 from sliding into the middle portion 9 of the slot 7 when the folding portion 3a of the back is urged towards its folded-down position.

The second lateral branch 10b communicates with the second end of the middle portion 9 of the slot 7 and likewise extends in a direction that is substantially circumferential relative to the second axis X2. In addition, in the second angular direction relative to the second axis X2, the branch 10b extends to a closed end which is adapted to receive the peg 8 when the folding portion 3a of the back 3 is in the folded-down position and the control piece 5 is in the rest position. In this lowered position of the folding portion 3a of the back, the second branch 10b of the slot 7 is adapted to lock the folding portion 3a of the back 3.

To this end, the end of the second side branch 10b of the slot 7 co-operates with the middle portion 9 of the slot 7 to define a catch 19 which comes into contact with the peg 8 when the folding portion 3a of the back 3 is in the folded-down position and the control piece 5 is in its rest position (FIG. 4), the catch 19 being shaped so as to bear against the peg 8 and prevent the peg 8 from sliding into the middle portion 9 of the slot 7 when the folding portion 3a of the back is urged towards its raised position. In addition, it can be seen that when the control piece 5 is in the actuated position the lateral branches 10a, 10b of the slot 7 are disposed in such a manner as to extend in directions that are substantially radial relative to the first pivotal axis X1 on opposite sides of said middle portion 9 of the slot 7.

Geometrically, if the distance between the pivot axis X1 and the base of one of the lateral branches 10a, 10b of the guide slot 7 is measured, then said distance corresponds substantially to the distance determined between said pivot axis X1 and the end of the other lateral branch of said guide slot 7.

In addition, the position of the axis X2 on said folding portion 3a is defined in such a manner that the angle defined by the normal to the point of contact between the peg 8 and the contact surface 17a, 17b of either one of the catches 18, 19 of the end portions 10a, 10b and a line passing through X2 and the center of the peg 8 is approximately 6°, i.e. just below the coefficient of friction of steel on steel.

The control piece 5 also has a projecting zone on its periphery for co-operating with the second handle 5a. The handle 5a is moved in a single direction by the user about its hinge point X2, regardless of the configuration in which the seat is to be found (in the stool configuration or in the raised position).

Because of the shape of the guide slot 7, the user need actuate the second handle 5a in a single direction only going away from its rest position, in which the folding portion of the back is locked in one or other of its two positions, towards an active position in which the folding portion of the back can leave either of said positions and is free to be moved into the other one of said positions.

The second handle 5a is caused to return from its active or actuated position to its rest position by means of a resilient member 11 of the helical spring type having one of its ends fixed to the folding portion 3a of the back and having its other end fixed to the control piece 5 or to an arm which is itself fixed to the pin on the axis of rotation X2 to which the control piece 5 is also fixed.

Figure 3:
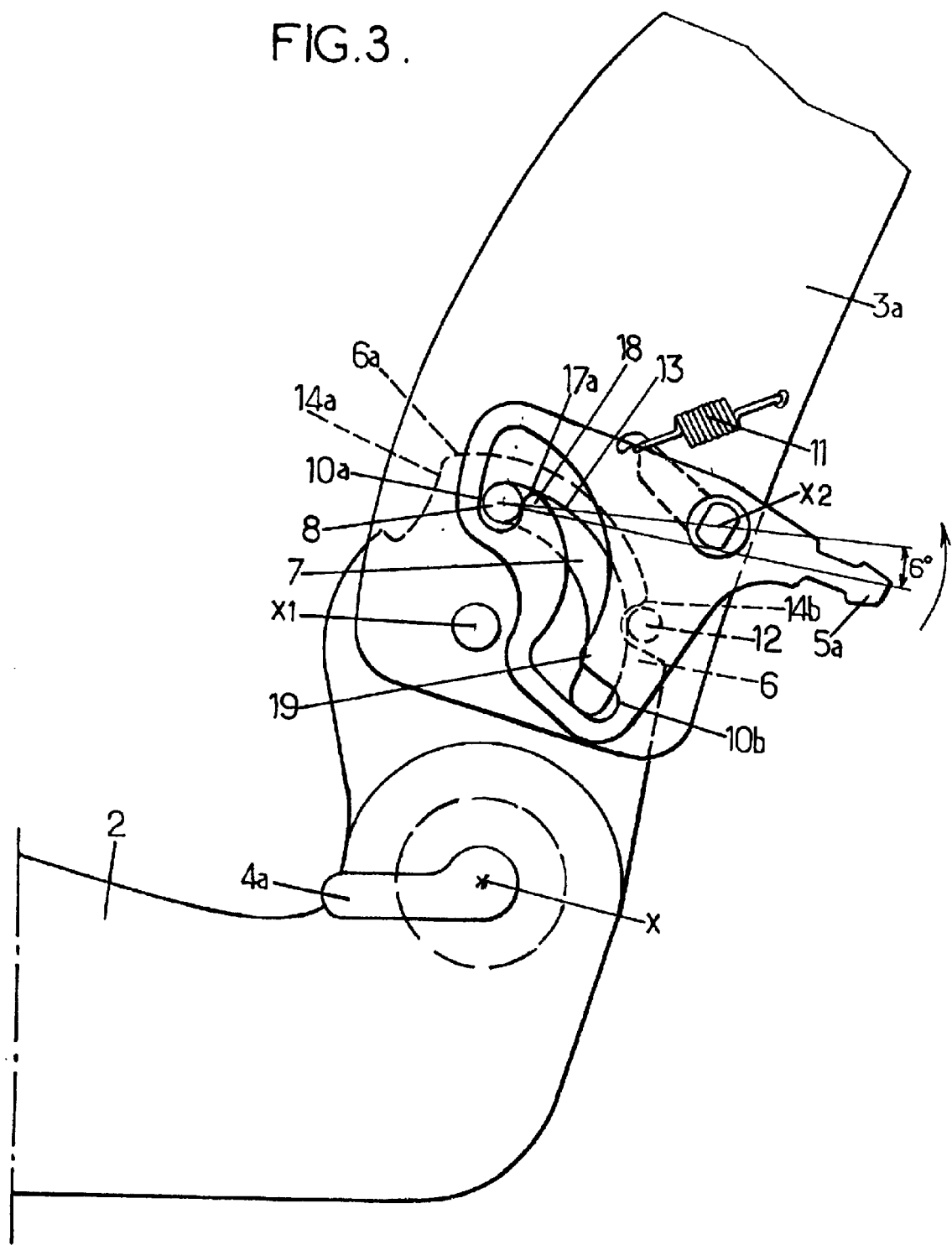
FIG. 3 is a side elevation view of the FIG. 1 seat, showing the raised position of the portion of the back that can be folded down.
Figure 4:
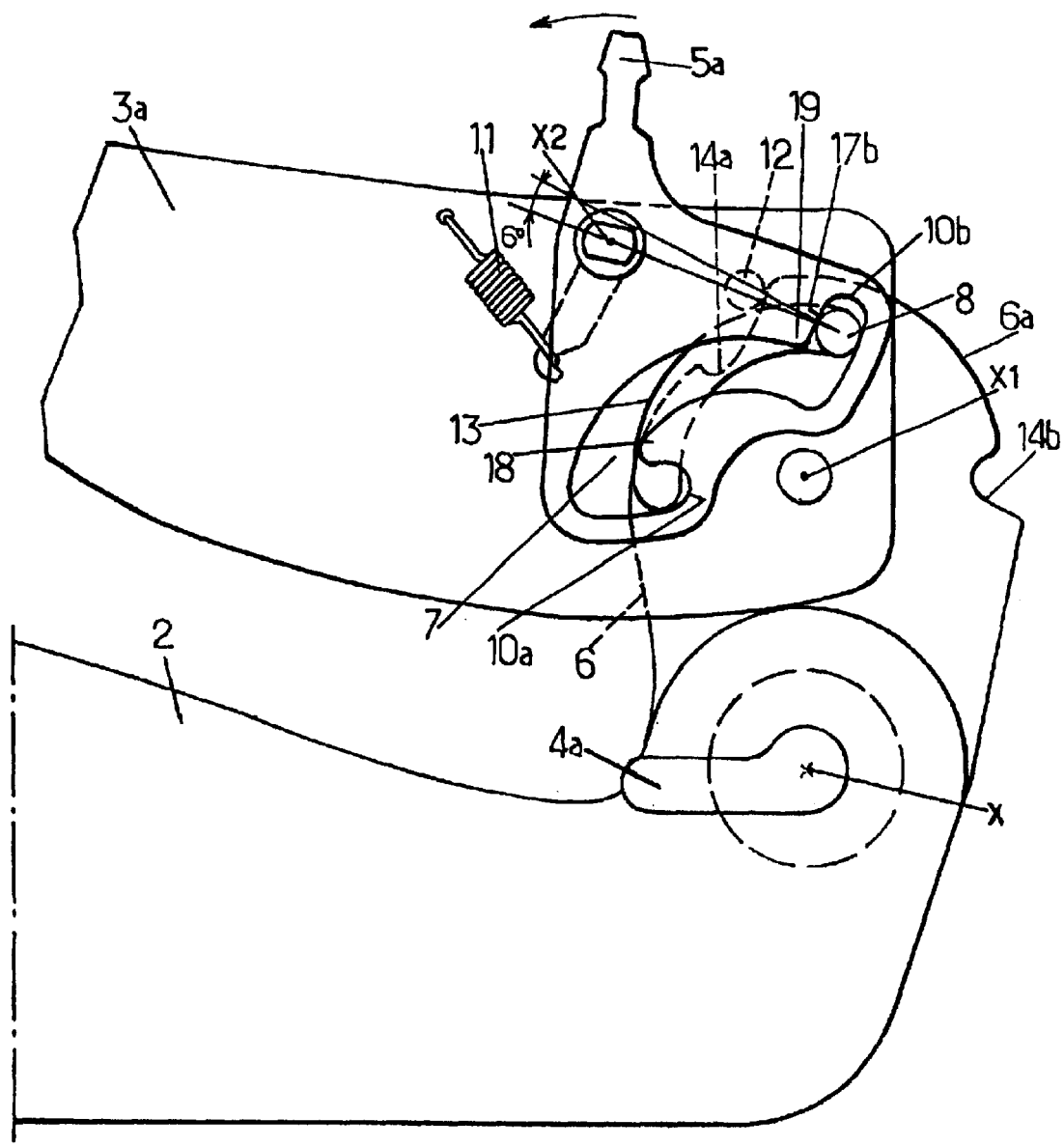
FIG. 4 is a side elevation view of the FIG. 1 seat, showing the folded-down position of the portion of the back that can be folded down.

As can be seen in FIGS. 3 and 4, the folding portion 3a of the back has a circularly arcuate slot 13 centered on the axis X1 and receiving the peg 8 which is secured to the rigid plate 6. This slot 13 is of a length that is substantially equivalent to the length of the middle portion 9 of the guide slot 7 so as to allow the folding portion 3a to pivot relative to the rigid plate 6 between its raised and lowered positions.

In FIG. 2, it can be seen that the lateral branches 10a, 10b of the guide slot 7 extend substantially perpendicularly relative to the ends of the middle portion, and that they are directed in opposite directions relative to the curvature of the middle portion 9.

FIGS. 3 and 4 show the folding portion 3a of the back respectively in its raised position and in its position folded down onto the seat proper 2. The control piece 5 can also have a guide member 12 for co-operating with a guide surface 6a formed on the rigid plate 6 to enable the peg 8 of the rigid plate 6 to be substantially centered within the guide slot 7 of the control piece 5 when the control piece is in its actuated position.

To this end, the guide surface 6a is formed on the top peripheral edge of the rigid plate 6, and when the guide member 12 is in contact with said guide surface 6a, the return force exerted by the spring 11 does not cause said control piece 5 to pivot into its rest position.

The user can thus release the handle 5a of the control piece 5 and the peg 8 will remain substantially centered in the guide slot 7, thus avoiding high levels of friction between said peg 8 and the edges of the guide slot 7, and preventing the peg 8 from being blocked or jammed accidentally inside the guide slot 7 due to the presence of the catches 18 and 19.

The guide surface 6a of the rigid plate 6 is defined at its ends by two notches 14a and 14b in which the guide member 12 of the control piece 5 is received when the folding portion 3a is in either of its raised or lowered extreme positions, thus allowing the spring 11 to return said control piece 5 into its rest position (FIGS. 3 and 4).

Thus, as shown in FIG. 3, the folding portion 3a of the back is locked in the raised position relative to the seat proper. The peg 8 projects from the folding portion and is held captive in the bottom of one of the lateral branches 10a of the guide slot 7, thereby preventing any rotation of the folding portion about the horizontal axis X1 secured to the rigid plate 6.

In order to enable the folding portion 3a of the back to tilt about the axis X1, the control piece 5 is urged in the direction of the arrow by the user acting on the second handle 5a and is brought into an active position in which the peg 8 can leave the lateral branch 10a and finds itself again on the axis of the middle portion 9 of the guide slot 7.

In the position shown in FIG. 4, the peg 8 is held captive in the other lateral branch 10b of the guide slot 7, with the folded portion then being locked in the stool position relative to the seat proper 2, and the user can then act on the second handle 5a in the same direction of the arrow in order to move the control piece 5 out from its rest position into its active position in which the peg 8 can escape from the lateral branch 10b, in the same manner as described above.

When the control piece 5 is in either one of its rest positions (positions in which the folding portion 3a of the back is locked relative to the seat proper), the resilient member 11 drives movement opposite to the travel direction of the control piece 5 (direction of the arrow) so as to force the peg 8 to be held captive within one or other of the lateral branches 10a, 10b, thus making it possible to guarantee that the folding portion 3a is locked in position relative to the seat proper 2.

The invention as described above provides numerous advantages:

by using a very small number of parts within the hinge it makes it possible using a single control piece provided with a single guide slot to lock the position of the back relative to the seat proper; and furthermore, this movement is performed by acting on the handle in the same angular direction on all occasions, thus simplifying operation and increasing convenience for the user.

What is claimed is:

1. A vehicle seat comprising:

a seat proper;

a back presenting at least a folding portion capable of pivoting to a limited extent about a first transverse horizontal axis between a raised position for use and a position in which it is folded down forwards;

a rigid plate connecting the folding portion of the back to the seat proper; and a control mechanism adapted to lock the folding portion of the back either in the raised position or in the folded-down position, said control mechanism including a control piece actuatable by a user to unlock said folding portion of the back;

wherein the control piece is pivotally mounted on the folding portion of the back about a second transverse horizontal axis parallel to the first axis, said control piece being urged resiliently in a first angular direction about the second axis towards a rest position and being movable by a user in a second angular direction opposite to the first away from its rest position into an actuated position, said control piece having an S-shaped guide slot within which a guide peg secured to the rigid plate is received, said slot comprising:

a curved middle portion adapted to receive the peg when the control piece is in the actuated position, said middle portion being disposed between the first and second axes and extending between first and second ends in the vicinity of which the peg is to be found respectively in the raised position and in the folded-down position of the folding portion of the back, said middle portion of the slot being disposed to extend in a substantially circumferential direction about the first axis when the control piece is in the actuated position;

a first lateral branch which communicates with the first end of the middle portion of the slot and which extends in the second angular direction substantially circumferentially about the second axis to a closed end which is adapted to receive the peg when the folding portion of the back is in the raised position and the control piece is in the rest position, the first branch of the slot being adapted then to lock the folding portion of the back in its raised position; and a second lateral branch communicating with the second end of the middle portion of the slot and extending in said angular direction substantially circumferentially about the second axis, to a closed end which is adapted to receive the peg when the folding portion of the back is in the folded-down position and the control piece is in the rest position, the second branch of the slot being adapted then to lock the folding portion of the back in the folded-down position.

2. A seat according to claim 1, in which the middle portion of the slot is circularly arcuate in shape, being centered on the first axis when the control piece is in its actuated position.

3. A seat according to claim 1, in which the end of the second lateral branch of the slot co-operates with the middle portion of the slot to define a catch which comes into contact with the peg when the folding portion of the back is in its folded-down position and the control piece is in its rest position, said catch being shaped to bear against the peg and prevent said peg from sliding into the middle portion of the slot when the folding portion of the back is urged towards its raised position.

4. A seat according to claim 1, in which the lateral branches of the slot are disposed so as to extend substantially radially relative to the first axis of rotation in opposite directions from said middle portion of the slot when the control piece is in the actuated position.

5. A seat according to claim 1, in which the control piece comprises a guide member for co-operating with a guide surface formed on the rigid plate to enable the peg to be substantially centered within the guide slot of the control piece when said control piece is in its actuated position.

6. A seat according to claim 5, in which the guide surface of the rigid plate is defined between two notches in which the guide member of the control piece is received when the folding portion of the back is in its raised position or its folded-down position so as to enable the control piece to be urged resiliently into its rest position.

7. A seat according to claim 1, in which the distance measured between the first axis of rotation and the base of either one of the lateral branches of the guide slot corresponds to substantially the distance as measured between said first axis of rotation and the end of the other lateral branch of said slot.

* * * * *